No. 741,050. PATENTED OCT. 13, 1903.
C. MAHON.
PIPE COUPLING FOR RAILWAY CARS.
APPLICATION FILED FEB. 25, 1899. RENEWED FEB. 10, 1903.
NO MODEL. 3 SHEETS—SHEET 1.
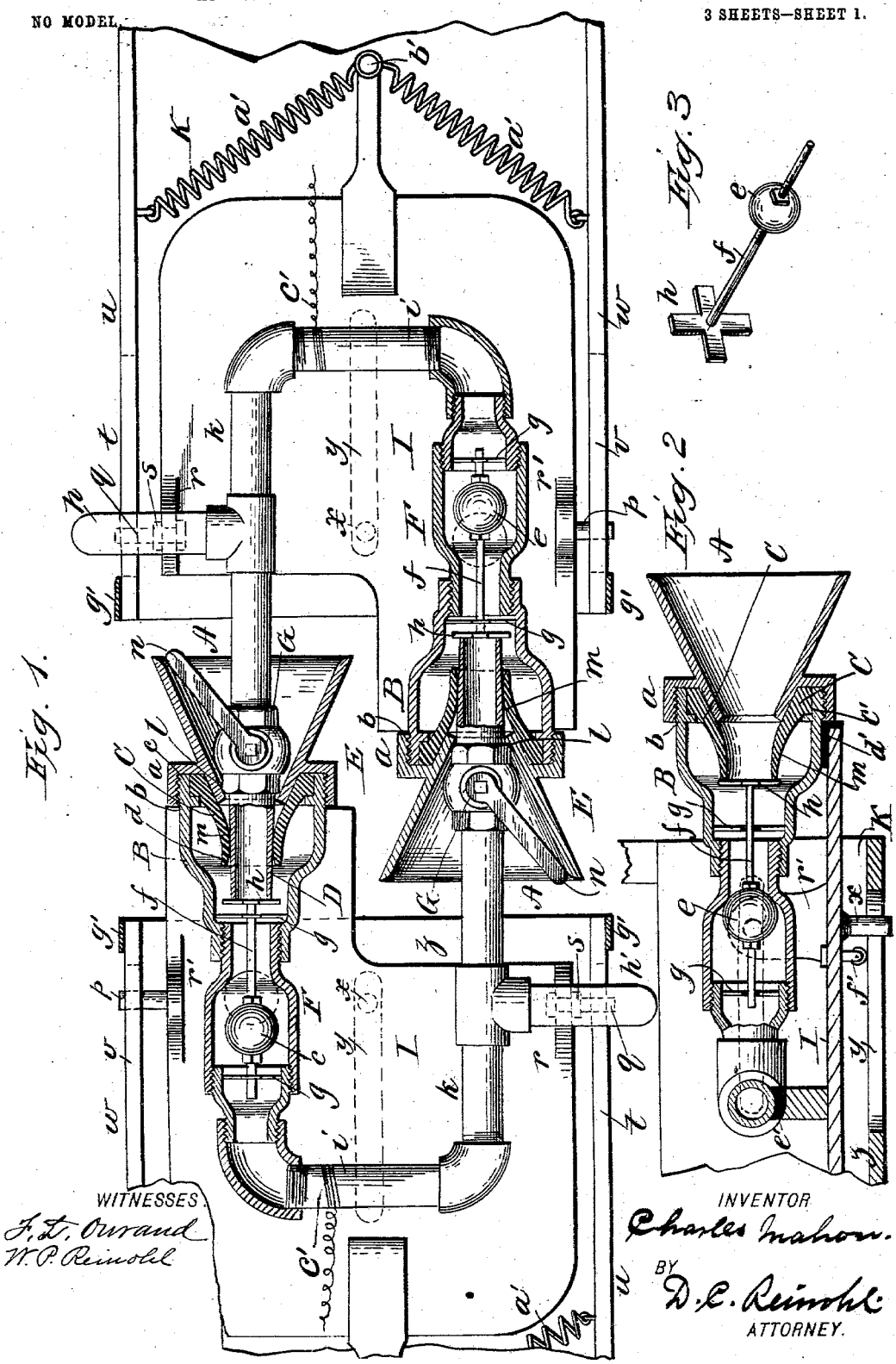
WITNESSES
F. L. Ourand
W. P. Reinohl
INVENTOR
Charles Mahon.
BY
D. L. Reinohl
ATTORNEY.

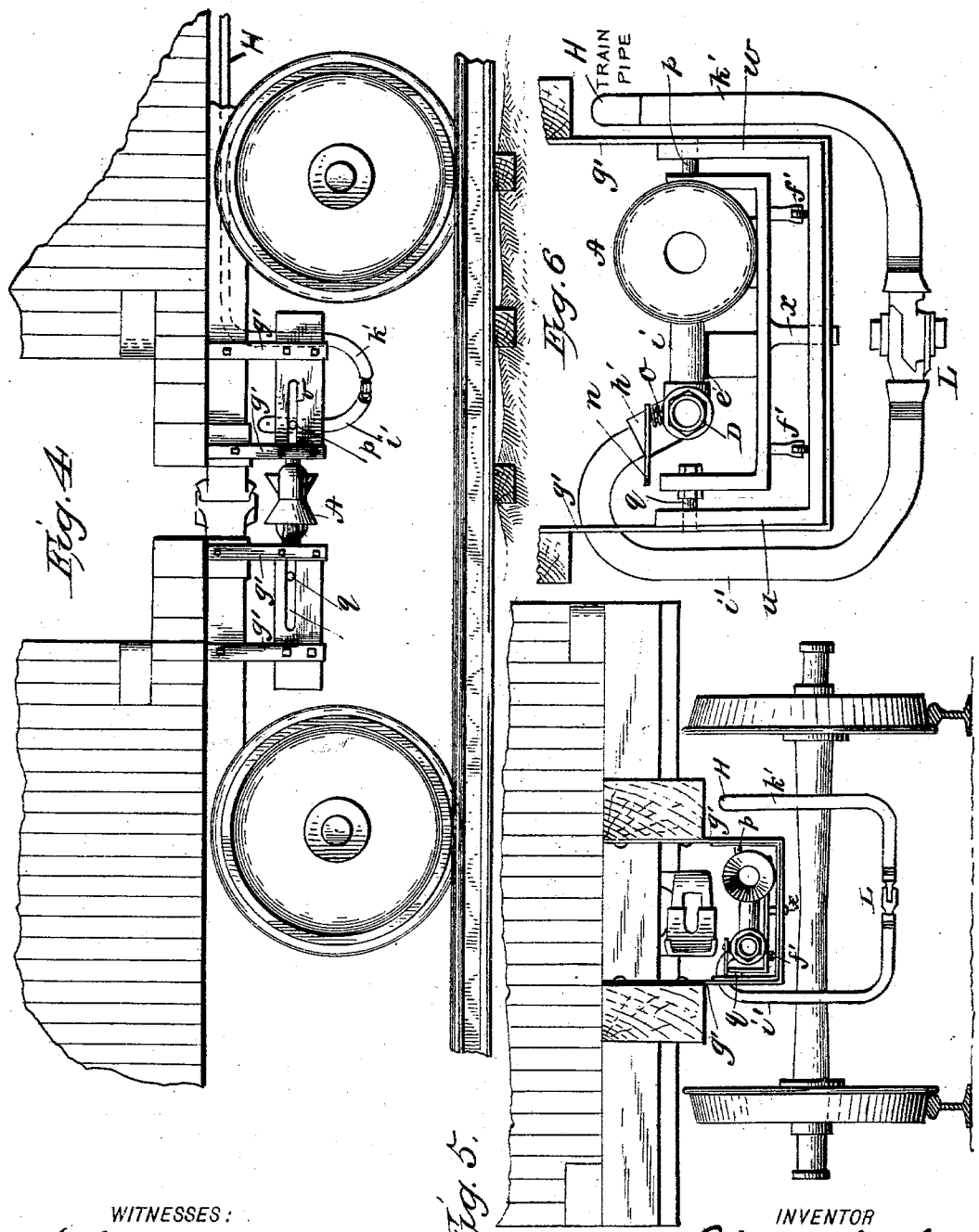

No. 741,050. PATENTED OCT. 13, 1903.
C. MAHON.
PIPE COUPLING FOR RAILWAY CARS.
APPLICATION FILED FEB. 25, 1899. RENEWED FEB. 10, 1903.
NO MODEL. 3 SHEETS—SHEET 3.
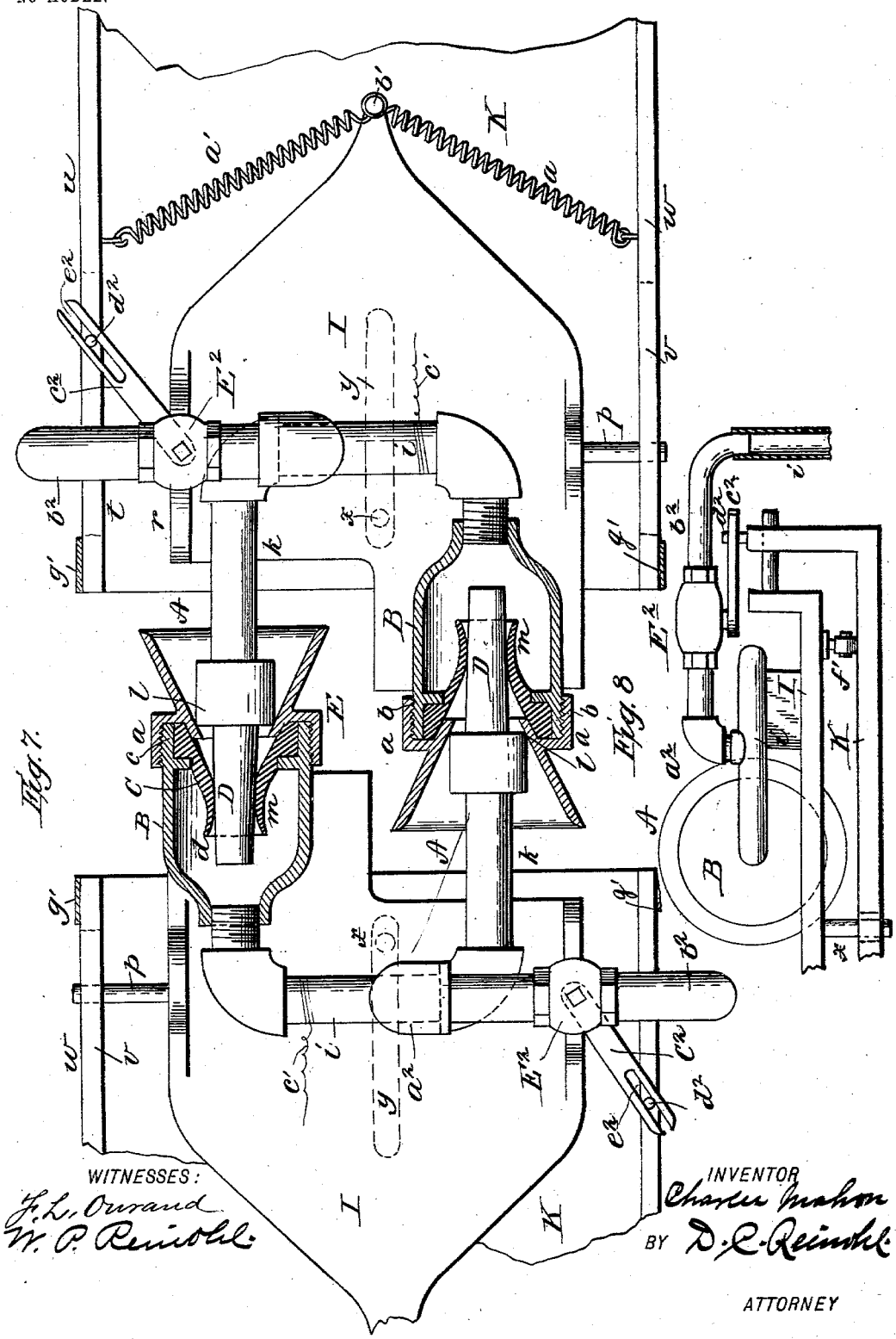
WITNESSES:
INVENTOR
Charles Mahon
BY
ATTORNEY No. 741,050. Patented October 13, 1903.

UNITED STATES PATENT OFFICE.

CHARLES MAHON, OF WASHINGTON, DISTRICT OF COLUMBIA, ASSIGNOR, BY DIRECT AND MESNE ASSIGNMENTS, TO MINNA LEGARÉ MAHON AND THEOPHILUS E. ROESSLE, OF WASHINGTON, DISTRICT OF COLUMBIA.

PIPE-COUPLING FOR RAILWAY-CARS.

SPECIFICATION forming part of Letters Patent No. 741,050, dated October 13, 1903.

Application filed February 25, 1899. Renewed February 10, 1903. Serial No. 142,801. (No model.)

*To all whom it may concern:*

Be it known that I, CHARLES MAHON, a citizen of the United States, residing at Washington, in the District of Columbia, have invented certain new and useful Improvements in Pipe-Couplings for Railway-Cars; and I do hereby declare the following to be a full, clear, and exact description of the invention, such as will enable others skilled in the art to which it appertains to make and use the same.

This invention relates to couplings for the pipes used on railway-cars for conducting fluid for operating the brakes or steam or hot water for heating or other purposes, has for its object the automatic coupling and uncoupling of such pipes and automatically opening and closing the valves in the service-pipes to which the couplings are attached, and consists in certain improvements in construction for effecting these objects and maintaining metallic contact in the coupling, as will be fully disclosed in the following specification and claims.

In the accompanying drawings, which form a part of this specification, Figure 1 represents a top plan view, partly in section, of the coupling, the carriage, and the bed detached from a car; Fig. 2, a vertical longitudinal section of one section of the coupling; Fig. 3, a perspective of the check-valve for the air-chamber; Fig. 4, a side elevation showing two cars connected; Fig. 5, an end view of a car provided with my invention; Fig. 6, a like view on an enlarged scale; Fig. 7, a top plan view of a modification of the coupling, and Fig. 8 a rear end view of the same.

Reference being had to the drawings and the letters thereon, A indicates the bell-mouthed member of each section of the coupling, which is provided with a right-angled annular flange $a$, provided with an internal screw-thread $b$, by which it is secured to the outer end of the air-chamber B, and the conical wall of said section extends into the air-chamber, as shown at $c$, to protect the interior of the packing against abrasion by the male member entering the packing, and to clamp and secure the tubular frusto-conical packing-ring C in position. The outer end of this ring is enlarged and rests in a seat $c$, extends into the air-chamber, out of contact therewith, and is distended at its inner end $d$ to prevent its being drawn inward as the male member D of the coupling is withdrawn from the female member E in uncoupling, and the bearing of the packing-ring upon the member D is intermediate its ends, to admit of free flexure of the coupling.

To the inner end of the air-chamber is attached a valve-chamber F, provided with a check-valve $e$, supported upon a horizontal rod $f$, which is held in position by guide-spiders $g$ $g$, and at its outer end is a smaller spider $h$, which is struck by the inner end of the tubular male member D and pushed back off its seat as the coupling-joint is made, and when the joint is uncoupled the air in the valve-chamber from the train-pipe closes the valve automatically.

From the valve-chamber extends laterally a pipe $i$, to which is connected at a right angle a pipe $k$, which extends forward in the horizontal plane of the valve-chamber F and is provided with a valve G, the outer end of the case of which is held in metallic contact with the inner end of the bell mouth, as shown at $l$, for a purpose which will hereinafter more fully appear, and to the outer end of the valve-case is attached the male member D of the coupling. This member is preferably made slightly tapering and coated with enamel to facilitate its passage through the packing-ring C and to protect it against corrosion.

The packing-ring is made of soft rubber and is capable of sufficient flexure to accommodate itself to the flexure of the car in rounding curves in the road-bed and is pressed tightly around the member D by the air under pressure of from sixty-five to seventy pounds operating upon the concave surface $m$ of the ring.

The valve may be of the turning-plug variety, and its lever $n$ is so set that it is struck by the wall of the bell-mouthed member A as the male member enters it and the valve opened automatically and communication opened with the train service-pipe H through pipes $h'$ and $i$, and when the member D is withdrawn the valve is closed automatically by a spring $o$. (Shown in Fig. 6.)

Each section of the coupling is supported upon a horizontal carriage I, which is provided with trunnions $p$ $q$, the latter being detachably secured to a lug $r$ by a nut $s$ to admit of its being inserted in a horizontal slot $t$ in one of the sides $u$ of the bed K, while the trunnion $p$ is permanently joined or secured to lug $r'$ and engages slot $v$ in the opposite side $w$. These trunnions and slots admit of longitudinal movement and vertical oscillation of the carriage and the section of coupling attached thereto. The carriage is also provided with a vertical pin $x$, extending downward from the under side of the carriage and engaging a longitudinal slot $y$ in the bottom $z$ of the bed and insures systematical lateral movement of the carriage and the coupling. These several movements are required to effect coupling by allowing for variations in alinements of the couplings due to causes well known to railroad men.

The longitudinal movement performs a very important function in my invention, as the sections of the couplings are normally in such position that when the joint is made each section has been pushed back with its carriage about three inches against the tension of the springs $a'$ $a'$, which are connected to the rear end of the carriage I, as by a post $b'$, and to the sides $u$ and $w$ of the bed at an angle, so as to maintain a constant pressure upon the carriage and consequent constant metallic contact between the outer end of the valve-case and the bell-mouthed member, so that the couplings of the train service-pipe may be used as a conductor of electricity throughout the train for signaling purposes by connecting the sections at each end of a car by a wire $c'$, the sections being insulated at $d'$ $e'$. (Shown in Figs. 2, 6, and 8.)

The carriage I rests upon rollers $f'$ $f'$ and travels freely on the bed K, which is supported in stirrups $g'$ $g'$, attached to the body of the car in any convenient and suitable position.

From the pipe $k$ extends a branch $h'$, to which is attached a section of rubber pipe or tubing $i'$, which is joined to a like section $k'$, attached to the train service-pipe H, and the two sections $i'$ and $k'$ are connected by an ordinary pipe-coupling L in common use on pipes on railway-cars. By this connection air from the train-pipe flows through the coupled members of the pipe, and in the event that a car is put in a train provided with the prevailing type of hand-couplings the coupling L is disconnected and the section $k'$ joined to the train-pipe of the car in the usual manner. The same connection of the pipe H with the branch $h'$ is made at both ends of a car.

In Figs. 7 and 8 I have shown a construction in which a valve $E^2$ is connected to the pipe $i$ by an elbow $a^2$, and from the valve extends a pipe $b^2$, to which the rubber section $i'$ is attached. The lever $c^2$ of the valve $E^2$ is provided with a slot $d^2$, which engages a pin $e^2$ on the side $u$ of the bed K. It is obvious that other connections between the valve and the bed may be made as circumstances may require. By this construction the valve-chamber F, the check-valve $e$, and the valve G in the male member D (shown in Figs. 1, 2, and 3) are dispensed with, and the valve $E^2$ is opened automatically by the movement of the coupling and the carriage I on the bed K while the carriage is being pushed back against the tension of the springs $a'$ $a'$ and closed as the coupling is separated and the carriage projected forward by the tension of the springs.

Having thus fully described my invention, what I claim is—

1. A pipe-coupling, in combination with a horizontal bed, and a horizontal carriage above the bed supporting the coupling having trunnions engaging the bed and provided with rollers between the bottom of the carriage and the bed for effecting lateral, longitudinal, and vertical oscillatory movement of the carriage and the coupling.

2. A pipe-coupling, in combination with a horizontal bed, a horizontal carriage above the bed supporting the coupling, having trunnions engaging the bed, and longitudinally movable on the bed upon rollers between the bottom of the carriage and the bed, and means for applying tension to the carriage.

3. A pipe-coupling, in combination with a horizontal bed, and a longitudinally-movable horizontal carriage above the bed supporting the coupling and provided with laterally-extending trunnions, rollers between the bottom of the carriage and the bed, and a vertical pin engaging said bed.

4. A pipe-coupling, in combination with a horizontal bed, a longitudinally-movable horizontal carriage above the bed supporting the coupling and provided with laterally-extending trunnions, rollers between the bottom of the carriage and the bed, a vertical pin engaging said bed and springs connected on opposite sides of the carriage to the bed.

5. A pipe-coupling, in combination with a bed having vertical sides slotted horizontally and a longitudinally-slotted bottom, and a carriage supporting the coupling and provided with laterally-extending trunnions engaging the horizontal slots, and a vertical pin engaging the longitudinal slot.

6. A pipe-coupling, in combination with a bed having vertical sides slotted horizontally and a longitudinally-slotted bottom a carriage supporting the coupling and provided with laterally-extending trunnions engaging the horizontal slots and a vertical pin engaging the longitudinal slot, and springs engaging the rear end of the carriage and the sides of the bed.

7. A pipe-coupling, in combination with a bed, a carriage supporting the coupling and supported on said bed by rollers, laterally-extending trunnions, a vertical pin, horizontal and longitudinal slots, and springs connecting the carriage to the bed.

8. A packing for automatic pipe-couplings consisting of a tubular frusto-conical and flexible ring having an enlarged portion at one end whereby it is supported, distended at its opposite end, a bearing-surface intermediate its ends, and a concave outer surface.

9. A pipe-coupling provided with a section having an air-chamber, and a tubular flexible packing-ring extending into said chamber and out of contact therewith; in combination with a flaring mouthpiece provided with a conical wall engaging the inner surface of said packing-ring.

10. A pipe-coupling provided with a section having an air-chamber, and a tubular flexible packing distended at its outer end and extending into said chamber out of contact therewith; in combination with a flaring-mouthed member provided with a conical wall engaging the inner surface of the packing-ring.

11. A pipe-coupling provided with a section having an air-chamber, and a conical, tubular and flexible packing-ring extending into said chamber out of contact therewith; in combination with a flaring-mouthed member provided with a conical wall engaging the inner surface of the packing-ring.

12. A pipe-coupling provided with a section having an air-chamber, and a tubular and flexible packing-ring distended at both of its ends and extending into said chamber out of contact therewith; in combination with a flaring-mouthed member provided with a conical wall engaging the inner surface of the packing-ring and at the outer end thereof.

13. A pipe-coupling having an air-chamber, a separable flaring mouthpiece provided with a conical wall and attached thereto, and a tubular packing-ring engaged by the conical wall of the mouthpiece and extending into the air-chamber out of contact therewith, and a tubular member extending in the horizontal plane of said air-chamber.

14. A pipe-coupling having an air-chamber, a separable flaring mouthpiece provided with a conical wall and attached thereto, a tubular packing-ring engaged by the conical wall of the mouthpiece and extending into the air-chamber out of contact therewith, a check-valve controlling one end of said chamber, a pipe connected with said chamber, and a tubular member connected to said pipe extending parallel with said chamber.

15. A pipe-coupling, consisting of two sections, each having a flaring-mouthed member provided with a conical wall, and an air-chamber, a tubular packing-ring engaged by the conical wall of the mouthpiece and extending into said chamber and out of contact therewith, a check-valve supported upon a horizontal rod and controlling one end of said chamber, and a tubular member extending into the air-chamber of the adjacent section and surrounded by the packing.

16. A pipe-coupling, consisting of two sections, each having a male and a female member, the latter provided with a mouthpiece having a conical wall, an air-chamber, a tubular packing-ring engaged by the conical wall of the mouthpiece of the female member and extending into said chamber and out of contact therewith, and a supply-valve operated automatically by coupling and uncoupling the two sections.

17. A pipe-coupling consisting of two sections, longitudinally and laterally movable carriages on which the sections are mounted, beds supporting the carriages, trunnions on the carriages engaging the beds, and rollers interposed between the bottom of the carriages and the beds; in combination with supply-valves operated automatically in coupling and uncoupling the sections.

18. A pipe-coupling consisting of two sections, longitudinally and laterally movable carriages on which the sections are mounted, fixed horizontal beds supporting the carriages, and trunnions on the carriages engaging the beds; in combination with supply-valves supported by the carriages, and connections between the valves and the beds for operating the valves by the movement of the carriages on the beds in coupling and uncoupling.

19. A packing for automatic pipe-couplings, consisting of a tubular frusto-conical and flexible ring, provided with means at one end for supporting the ring, a concavo-convex wall and a distended opposite end.

20. A pipe-coupling provided with a section having an air-chamber provided with a seat at its outer end, and a tubular flexible packing-ring engaging said seat at one end, extending into the chamber and out of contact therewith, in combination with a flaring mouthpiece provided with a conical wall, the latter engaging the inner surface of said packing-ring.

21. A packing for automatic pipe-couplings, consisting of a tubular frusto-conical and flexible ring provided with means at one end for supporting the ring, a bearing-surface intermediate its ends, and a distended opposite end.

22. A pipe-coupling provided with a section having an air-chamber provided with a seat at its outer end, and a tubular flexible packing-ring engaging said seat at one end, extending into the chamber and out of contact therewith; in combination with a flaring mouthpiece provided with a right-angled flange, and a conical wall, the latter engaging the inner surface of said packing-ring.

23. The combination with a bed having vertical sides slotted horizontally, a carriage provided with trunnions engaging the horizontal slots, of a coupling-section mounted on the carriage, said coupling-section including a chamber provided with a flaring mouthpiece and frusto-conical packing-ring constituting a female member and also provided with a male member, means for supplying fluid-pressure to said two members and automatic means for controlling such supply, substantially as described.

24. The combination with a bed having vertical sides slotted horizontally, a carriage provided with trunnions engaging the horizontal slots, of a coupling-section mounted on the carriage comprising male and female members connected with a source of fluid-pressure supply, a flaring mouthpiece on the female member and a turn-valve on the male member adapted to be operated by engagement with a female member, substantially as described.

25. The combination with a bed having vertical sides slotted horizontally, a carriage provided with trunnions engaging the horizontal slots, springs normally holding the carriage in a forward position parallel with the sides of the bed, of a coupling-section mounted on the carriage comprising male and female members connected with a source of fluid-pressure supply, a flaring mouthpiece in the female member and a turn-valve on the male member adapted to be operated by engagement with a female member, substantially as described.

26. In a pipe-coupling for cars, the combination of a horizontal support, a carriage located wholly above the support, couplings on the carriage, antifriction devices between the bottom of the carriage and the support, and means for applying tension to the carriage, substantially as described.

In testimony whereof I affix my signature in presence of two witnesses.

CHARLES MAHON.

Witnesses:
D. C. REINOHL,
W. P. REINOHL.